United States Patent [19]

Kaiser

[11] Patent Number: 5,378,132
[45] Date of Patent: Jan. 3, 1995

[54] APPARATUS FOR PRODUCING GRANULES OR PASTILLES FROM FLOWABLE MATERIAL

[76] Inventor: Herbert Kaiser, Friedensstrabe 241, D-4150 Krefeld II, Germany

[21] Appl. No.: 940,956
[22] PCT Filed: Apr. 22, 1991
[86] PCT No.: PCT/EP91/00771
 § 371 Date: Dec. 1, 1992
 § 102(e) Date: Dec. 1, 1992
[87] PCT Pub. No.: WO91/16151
 PCT Pub. Date: Oct. 31, 1991

[30] Foreign Application Priority Data
 Apr. 26, 1990 [DE] Germany .................. 4013405

[51] Int. Cl.⁶ .................................. B29B 9/00
[52] U.S. Cl. ............................ 425/6; 264/5; 425/74; 425/75; 425/331; 425/365
[58] Field of Search ................ 264/5, 8, 13, 37; 425/6, 74, 75, 328, 331, 335, 365, 375, 377, 382 R

[56] References Cited

U.S. PATENT DOCUMENTS

| 2,161,356 | 6/1939 | Jewett | 425/75 |
|---|---|---|---|
| 2,201,747 | 5/1940 | Staudt | 425/75 |
| 2,951,262 | 9/1960 | Dorman et al. | 425/74 |
| 3,427,683 | 2/1969 | Nazaruk et al. | 425/328 |
| 5,013,498 | 5/1991 | Froeschke | 264/37 |
| 5,198,233 | 3/1993 | Kaiser | 425/365 |

FOREIGN PATENT DOCUMENTS

| 1361828 | 4/1964 | France | 425/365 |
|---|---|---|---|
| 3902957 | 6/1990 | Germany . | |

*Primary Examiner*—Charles S. Bushey
*Attorney, Agent, or Firm*—Lappin & Kusmer

[57] ABSTRACT

In a device for producing granules or tablets from fluid materials, the material is fed to the press-slot between a rotative hollow cylinder with an inner toothing and a press-cylinder with an outer toothing that engages the inner toothing. Bores extend from the bottom of the teeth of the inner toothing of the hollow cylinder up to its outer side. The material is pressed through these bores when the hollow cylinder engages the press-cylinder and is laid as tablets or granules on a cooling surface. At least one part of the outer circumference of the hollow cylinder remote from the cooling surface is surrounded by a heating shell. Outside the heating shell and spaced apart from it is arranged another shell in such a way that, between the heating shell and the other shell, a waste gas shaft is formed in communication with a suction nozzle for withdrawing the gases that emanate from the deposited material as it cools.

20 Claims, 2 Drawing Sheets

APPARATUS FOR PRODUCING GRANULES OR PASTILLES FROM FLOWABLE MATERIAL

BACKGROUND OF THE INVENTION

The invention relates to improvements in an apparatus for producing granules or pastilles from flowable material.

Such an apparatus is known from DE-PS 3,902,957. In this known apparatus, the flowable material is supplied to the pressing gap between a rotating hollow roll with internal toothing and an externally toothed extrusion roll in engagement with said internal toothing. From the respective teeth bottoms of the internal toothing of the hollow roll bores extend to the outer side thereof through which the material is extruded on engagement with the extrusion roll and deposited in the form of pastilles or granules on a cooling surface. The cooling surface is formed by a revolving cooling belt which moves past the lower region of the hollow roll. The portion of said hollow roll lying above a horizontal center plane of the hollow roll is covered by a heating jacket which permits an influencing of the temperature of the hollow roll.

On emergence of the material from the bores of the hollow roll and on deposition of the pastilles or granules on the cooling belt, in the processing of many materials waste gases are formed which in accordance with environmental protection regulations cannot be released uncontrolled in the environment.

The invention is based on the problem of providing an apparatus of the type mentioned at the beginning which with simple construction permits reliable collection of the waste gases forming in the processing of the materials.

This problem is solved by the features set forth in the following description and as illustrated in the accompanying drawings.

SUMMARY OF THE INVENTION

In the improved apparatus of this invention, flowable material is supplied to the pressing gap between a revolving hollow roll with internal toothing and an externally toothed extrusion roll in engagement with said internal toothing. Bores are provided which extend from the respective teeth bottoms of the internal toothing of the hollow roll to the outside thereof. On engagement with the extrusion roll, the flowable material is extruded through the bores and deposited in the form of pastilles or granules on a cooling surface. At least a portion of the outer periphery of the hollow roll remote from the cooling surface is surrounded by a heating jacket such that on the outer side of the heating jacket and spaced therefrom is a further jacket arranged in such a manner as to create a waste gas well therebetween. The waste gas well is formed so as to communicate with an extraction connection tube piece for channeling the gases emerging from the deposited flowable material as it cools.

With the configuration of the apparatus according to the invention, the waste gases are extracted directly in the region in which they are formed, i.e. in the region in which the material emerges from the bores of the hollow roll and is deposited on the cooling surface. Due to the fact that the waste gas well is partially defined by the outer surface of the heating jacket present in any case, a simple construction is obtained; the further jacket forming the other wall of the waste gas well and arranged on the outer side of the heating jacket simultaneously provides the insulation, otherwise also necessary, of the outer side of the heating jacket and itself may be insulated.

Due to the fact that the waste gas well is also heated by the outer side of the heating jacket, condensation of the collected gases in this region is reliably avoided and the waste gases pass via the waste gas well to an exhaust connection tube piece from whence the waste gases can be supplied to solvent recovery and/or filter means.

To enable the extraction effect of the waste gas well to be controlled, said waste gas well, preferably sealed at the end sides of the hollow roll, can be sealed at its rear end, seen in the direction of rotation and opposite the intake end for the waste gases, by an adjustable flap which permits control of the ambient air sucked in at this rear end.

Said flap is preferably articulately connected to the further jacket so that in the partially opened state part of the waste gases which possibly emerge from material adhering to the outer periphery of the hollow roll can also be extracted.

The heating jacket and/or the further jacket preferably extend over the region of the hollow roll lying above the horizontal center plane concentrically to said roll whilst the intake end lying beneath said center plane adjacent to the region of the cooling surface on which the pastilles or granules are deposited is directed directly onto said cooling surface and possibly widened in order to improve the induction effect for the waste gases. Said intake end can extend substantially up to the vicinity of the cooling surface.

An example embodiment will be explained in detail hereinafter with the aid of the drawings.

DESCRIPTION OF THE PREFERRED EMBODIMENT

Figure 1:
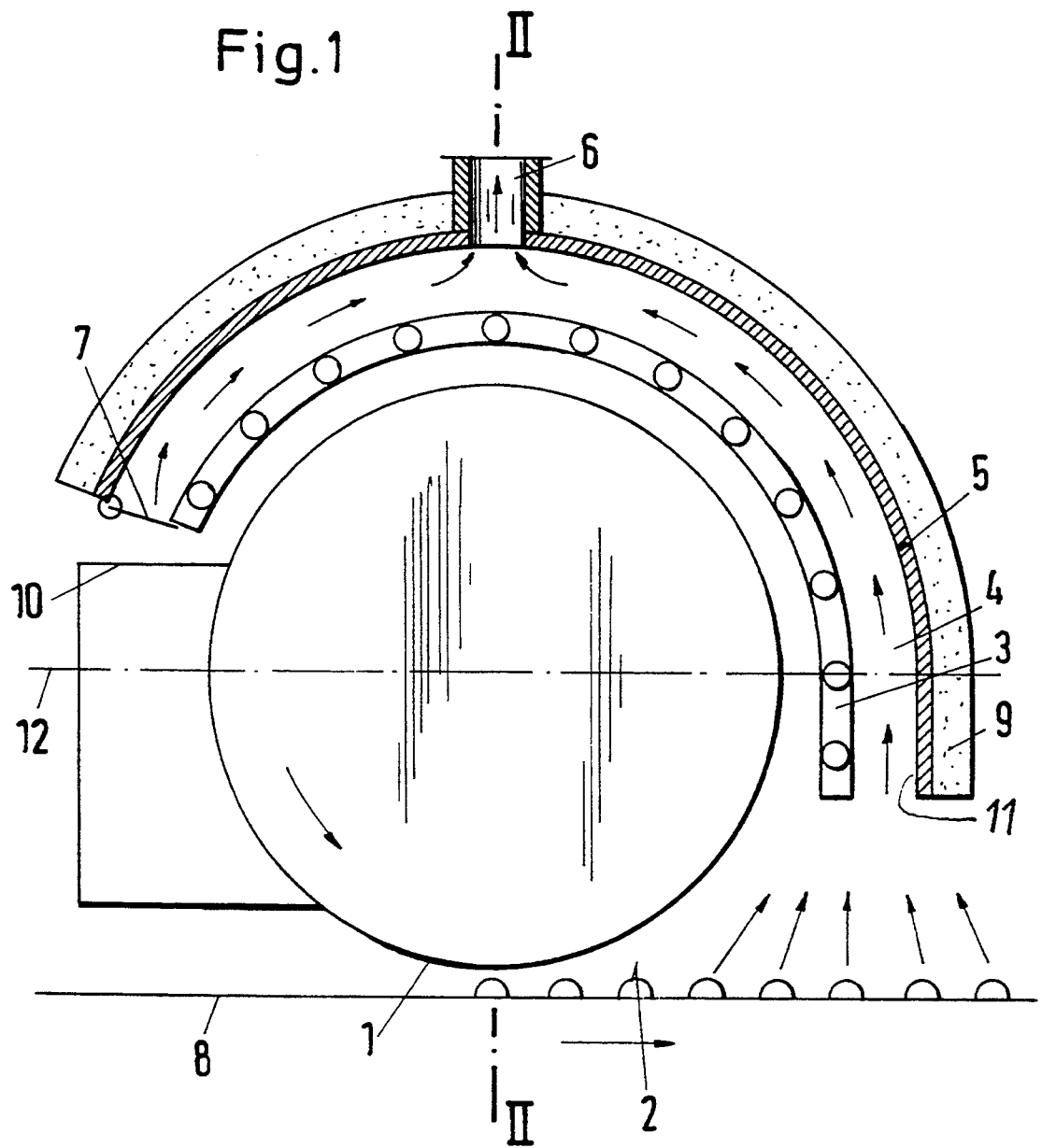
FIG. 1 shows a simplified schematic cross-sectional view of one embodiment of the apparatus.
Figure 2:
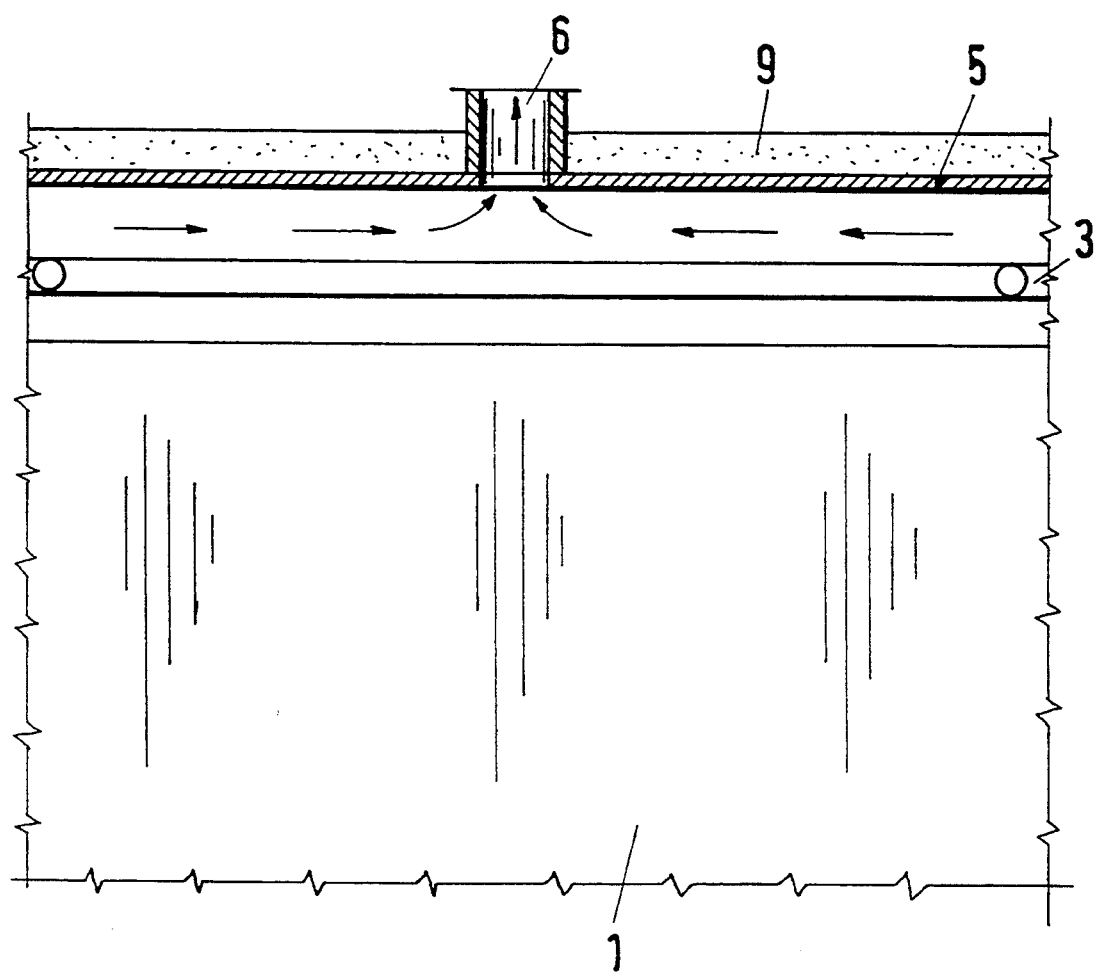
FIG. 2 is a sectional view along the line II—II of FIG. 1 shown broken away.

FIG. 1 shows in simplified form a cross-sectional view of an embodiment of the apparatus, the basic apparatus corresponding for example to that explained in detail in DE-PS 3,902,957.

Said apparatus comprises a hollow roll 1 which is provided on its inner surface with an internal toothing which cooperates with the external toothing of an extrusion roll, not illustrated, preferably arranged in the lower region of the hollow roll. Material introduced into the nip or pressing gap between the extrusion roll and the internal toothing of the hollow roll 1 is extruded through bores which extend from the teeth bottoms of the internal toothing of the hollow roll 1 to the outer side thereof so that said material is deposited in the form of pastilles or granules 2 on a cooling surface, preferably a revolving cooling belt 8.

Part of the periphery of the hollow roll 1 is provided for controlling the temperature of said roll with a heating jacket 3 which is arranged radially spaced from the hollow roll 1 and which extends in most cases over the region of the hollow roll lying above a horizontal center plane 12 and concentrically to said roll.

In the embodiment of the apparatus illustrated said heating jacket 3 is surrounded in spaced relationship by a further jacket 5 which preferably carries an insulating layer 9 on its outer side. The further jacket 5 therefore forms insulation for the outer side of the heating jacket 3 so that the heat losses thereof are reduced. Between the heating jacket 3 and said further jacket 5 a waste gas well 4 is formed which communicates with an exhaust connection tube pipe 6.

As apparent from FIG. 1, the intake end 11 of said waste gas well 4, which lies above the deposition region of the pastilles on the cooling surface 8, is directed substantially onto said cooling surface (beneath said center plane 12); said intake end may if necessary be widened in funnel form.

Immediately after deposition of the material onto the cooling surface 8 waste gases emerge from the pastilles or granules 2 which should be sucked off as rapidly as possible to prevent said waste gases getting into the ambient air. Said waste gases however emerge from the granules or pastilles 2 only over a limited distance on further movement of the cooling belt 8 forming the cooling surface so that the waste gas well 4 formed by the heating jacket 3 and the further jacket 5 can effectively extract said waste gases.

On the end of the exhaust well 4 opposite the intake end 11 an adjustable flap may be arranged which is preferably articulately connected to the further jacket 5 so that on partial opening of said flap 7 a gap is formed between said flap and the heating jacket through which in addition to the ambient air waste gases are also sucked in which escape from the material which possibly continues to adhere to the outer surface of the hollow roll 1 on the movement thereof away from the cooling belt 8 and if necessary is scraped off said outer surface with the aid of a scraper plate 10.

The waste gas extracted via the extraction connecting piece 6 from the waste gas well 4 can be supplied to a purifying apparatus for the waste gas, for example a condensation or filter means, so that the waste gases forming when the material is deposited on the cooling belt 8 can be rendered harmless in efficient manner.

In the manner already explained, the entrance of ambient air into the extraction well and thus the extraction effect at the intake end 11 of the waste gas well 4 can be controlled by the flap 7. This makes it possible to control in optimum manner also the efficiency of following condensation and filter means behind the extraction connecting piece 6.

The end faces of the waste gas well 4 formed by the heating jacket 3 and the further jacket 5 may be either completely or partially sealed to control an optimum extraction of the waste gases forming during operation of the apparatus.

In simple manner, by simple addition of a further jacket the apparatus according to the invention permits effective extraction of the waste gases forming in the product deposition directly at their site of formation without complicated extraction means being necessary.

By arranging the extraction well between the heating jacket and the further jacket and possibly by insulating the outer side of the further jacket, condensation of said waste gases in the waste gas well is reliably prevented.

Having described the invention, what is claimed is:

1. In an apparatus for producing granules or pastilles from flowable material in which the material is supplied to a pressing gap between a revolving hollow roll with internal toothing and an externally toothed extrusion roll in engagement with said internal toothing, said hollow roll rotating in a predetermined direction, bores being provided which extend from the respective teeth bottoms of the internal toothing of the hollow roll to the outside of the hollow roll and through which the material is extruded on engagement with the extrusion roll and deposited in the form of pastilles or granules on a moving cooling surface having a pastille discharge region, further wherein at least a portion of an outer periphery of the hollow roll that is remote from the cooling surface is surrounded by a heating jacket, the improvement which comprises providing on an outer side of said heating jacket and spaced therefrom a second jacket means having an inner side and an outer side arranged in such a manner that, between said heating jacket and said second jacket means, a generally arcuate waste gas well is formed comprising a first inlet opening in an upstream region as seen in said predetermined direction of rotation of said hollow roll and above said pastille discharge region, and two end faces, said waste gas well communicating with extraction connection means for withdrawing any gases emerging from said material as it cools.

2. Apparatus according to claim 1, further wherein said heating jacket and said second jacket means are arranged at least partially concentrically with respect to said hollow roll.

3. Apparatus according to claim 2, further wherein said heating jacket and said second jacket means are arranged substantially concentrically above a horizontal center plane of said hollow roll, said heating jacket and said second jacket means also extending beneath said center plane in a direction towards said cooling surface on said pastille discharge region thereof.

4. Apparatus according to claim 1 further wherein said waste gas well comprises a second inlet opening at a downstream end of said gas well as seen in said predetermined direction of rotation of said hollow roll, said second inlet opening being partially or completely sealed by an adjustable flap for controlling the inflow of ambient air.

5. Apparatus according to claim 1 further wherein said waste gas well is sealed at said end faces thereof.

6. Apparatus according to claim 1 further wherein said second jacket means is provided on its outer side with an insulating layer.

7. Apparatus according to claim 2, further wherein said waste gas well comprises a second inlet opening at a downstream end of said gas well as seen in said predetermined direction of rotation of said hollow roll, said second inlet opening being partially or completely sealed by an adjustable flap for controlling the inflow of ambient air.

8. Apparatus according to claim 3, further wherein said waste gas well comprises a second inlet opening at a downstream end of said gas well as seen in said predetermined direction of rotation of said hollow roll, said second inlet opening being partially or completely sealed by an adjustable flap for controlling the inflow of ambient air.

9. Apparatus according to claim 2, further wherein said waste gas well is sealed at the end faces thereof.

10. Apparatus according to claim 3, further wherein said waste gas well is sealed at the end faces thereof.

11. Apparatus according to claim 4, further wherein said waste gas well is sealed at the end faces thereof.

12. Apparatus according to claim 2, further wherein said second jacket means is provided on its outer side with an insulating layer.

13. Apparatus according to claim 3, further wherein said second jacket means is provided on its outer side with an insulating layer.

14. Apparatus according to claim 4, further wherein said second jacket means is provided on its outer side with an insulating layer.

15. Apparatus according to claim 5, further wherein said second jacket means is provided on its outer side with an insulating layer.

16. Apparatus according to claim 8, further wherein said waste gas well is sealed at the end faces thereof.

17. Apparatus according to claim 16, further wherein said second jacket means is provided on its outer side with an insulating layer.

18. Apparatus according to claim 11, further wherein said second jacket means is provided on its outer side with an insulating layer.

19. Apparatus according to claim 10, further wherein said second jacket means is provided on its outer side with an insulating layer.

20. Apparatus according to claim 8, further wherein said second jacket means is provided on its outer side with an insulating layer.

* * * * *